(12) United States Patent
Feger et al.

(10) Patent No.: US 8,408,448 B1
(45) Date of Patent: Apr. 2, 2013

(54) FORMING CONSTANT DIAMETER SPHERICAL METAL BALLS

(75) Inventors: Claudius Feger, Poughkeepsie, NY (US); Peter Alfred Gruber, Mohegan Lake, NY (US); Mark Harrison McLeod, Poughkeepsie, NY (US); Jae-Woong Nah, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/371,431

(22) Filed: Feb. 11, 2012

(51) Int. Cl.
*B23K 31/02* (2006.01)

(52) U.S. Cl. ......... 228/215; 228/223; 228/246; 228/256

(58) Field of Classification Search ............... None
See application file for complete search history.

(56) References Cited

U.S. PATENT DOCUMENTS

| | | | |
|---|---|---|---|
| 5,244,143 A | | 9/1993 | Ference |
| 5,735,452 A | * | 4/1998 | Yu et al. ............. 228/254 |
| 6,090,301 A | | 7/2000 | Mizukoshi |
| 6,234,382 B1 | * | 5/2001 | Rischke et al. ............. 228/245 |
| 6,332,569 B1 | * | 12/2001 | Cordes et al. ............. 228/254 |
| 7,332,424 B2 | | 2/2008 | Belanger |
| 7,980,446 B2 | * | 7/2011 | Buchwalter et al. ............. 228/33 |
| 8,132,775 B2 | * | 3/2012 | Goldmann ............. 249/119 |
| 8,162,203 B1 | * | 4/2012 | Gruber et al. ............. 228/256 |
| 2006/0035454 A1 | * | 2/2006 | Belanger et al. ............. 438/616 |
| 2007/0246516 A1 | * | 10/2007 | Cordes et al. ............. 228/180.22 |
| 2008/0164609 A1 | | 7/2008 | Gruber |
| 2008/0272177 A1 | * | 11/2008 | Cordes et al. ............. 228/33 |
| 2009/0120999 A1 | * | 5/2009 | Indyk et al. ............. 228/245 |
| 2009/0309219 A1 | | 12/2009 | Gruber |
| 2010/0001045 A1 | * | 1/2010 | Cordes et al. ............. 228/208 |
| 2010/0116871 A1 | * | 5/2010 | Gruber et al. ............. 228/244 |
| 2012/0273155 A1 | * | 11/2012 | Gruber et al. ............. 164/76.1 |

\* cited by examiner

*Primary Examiner* — Kiley Stoner
(74) *Attorney, Agent, or Firm* — Louis J. Percello; Robert M. Trepp (57) ABSTRACT

A process and tools for forming spherical metal balls is described incorporating molds, injection molded solder, a liquid or gaseous environment to reduce or remove metal oxides and an unconstrained reflow of metal in a heated liquid or gas and solidification of molten metal in a cooler liquid or gas.

10 Claims, 6 Drawing Sheets

FORMING CONSTANT DIAMETER SPHERICAL METAL BALLS

CROSS REFERENCE TO A RELATED APPLICATION

This application is cross referenced to U.S. patent application Ser. No. 13/371,430 filed on even date herein entitled "FORMING METAL PREFORMS AND METAL BALLS" which is directed to an apparatus and method for forming metal performs, metal shapes and metal balls with controlled diameters of the same size utilizing injection molded metal and metal reflow in molds and is incorporated herein by reference.

BACKGROUND

The present invention relates to tools and processes for forming spherical metal balls useful in microelectronics and more specifically, to injection molded metal and unconstrained metal reflow in a gas or liquid to form spherical metal balls such as spherical solder balls.

SUMMARY

In accordance with the present invention, a method for forming spherical metal balls is described comprising filling cavities in a mold with molten metal; cooling the molten metal to a solid in the cavity; selecting a plate having cavities having openings facing openings of the cavities in the mold, the cavities in the plate larger than the corresponding facing cavities in the mold; filling the cavities in the plate with a liquid for removing metal oxides; placing the cavity openings of the mold facing downwards and above the corresponding cavity openings facing upwards in the plate; heating the mold and plate above a metal melting temperature to reflow the metal whereby the metal is released from the cavity in the mold and passes into the liquid in the corresponding facing cavity in the plate, the metal being unconstrained in the liquid forming spherical metal balls due to metal surface tension; and cooling the spherical metal balls below the melting temperature to form solid spherical metal balls.

The invention further describes an apparatus for forming metal balls comprising a conveyor belt containing a plurality of cavities;
a plurality of guides to receive said conveyor belt and the plurality of cavities, the guides directing the plurality of cavities passed a plurality of processing stations in sequential order;
a first processing station includes a hot stage for heating the plurality of cavities and includes an injection molded solder tool for filling the plurality of cavities with molten metal as the plurality of cavities passes by the first processing station;
a second processing station includes a hot stage for heating the plurality of cavities and metal, a housing for containing a gaseous environment and a gas input port for filling the housing with a second gas;
a third processing station includes a hot stage for heating the plurality of cavities and metal above the melting temperature of the metal, a housing for containing a gaseous environment and a gas input port for filling the housing with a gas;
a fourth processing station includes a cold stage for cooling the plurality of cavities and the metal to solidify the metal; and
a fifth processing station includes a manifold and openings for directing a third gas at the lower side of the plurality of cavities and an input port for filling the manifold with the third gas whereby said directed gas loosens and removes said metal balls from the plurality of cavities.

The present invention further describes an apparatus for transferring metal solidified in cavities in an upper surface of a flexible tape comprising first and second spaced apart rollers for directing a lower surface of the flexible tape there over; the second roller positioned to guide the upper surface of the flexible tape to face towards ground;
a transducer coupled to the first flexible tape after the first and second rollers for vibrating the flexible tape whereby the metal in the cavities are vibrated loose and moves away from the flexible tape with the aid of the vibration and gravity.

The present invention further describes an apparatus for forming metal balls comprising a flexible tape having through-hole cavities filled with metal; first and second spaced apart rollers for directing the flexible tape there over; a container for holding liquid up to at least a first level; a liquid pump for generating an output stream; a heater for heating the liquid in the container in a first zone; the second roller positioned in the container below the first level to guide the flexible tape in the first zone in the liquid; and the output stream directed on the flexible tape whereby the metal in the cavities is one of dislodged or melted and moves away from the flexible tape with the aid of the output stream and gravity; the container containing liquid in a first zone and second zone; the liquid in the first zone having oxygen below 1000 ppm and having a temperature to melt the metal; the liquid in the second zone to receive melted metal from the first zone; the liquid in the second zone having oxygen below 1000 ppm and a temperature to cool and solidify the melted metal whereby a surface tension of the melted metal form metal balls in the first zone and solid metal balls in the second zone.

BRIEF DESCRIPTION OF THE SEVERAL VIEWS OF THE DRAWINGS

These and other features, objects, and advantages of the present invention will become apparent upon consideration of the following detailed description of the invention when read in conjunction with the drawing in which.

DETAILED DESCRIPTION

Figure 1:
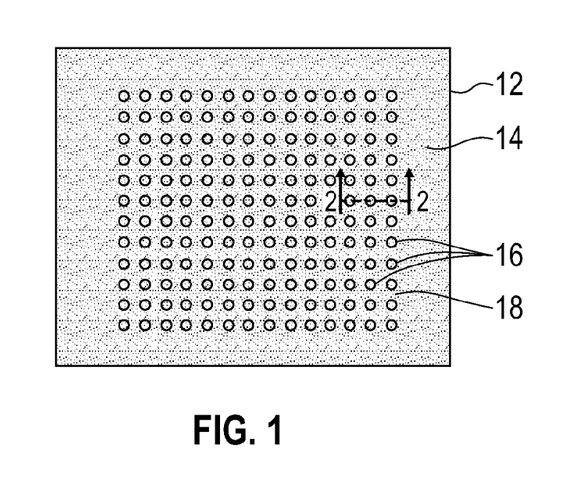
FIG. 1 is a top view of a mold with blind cavities.

Referring now to the drawing, FIG. 1 shows mold 12 which may be a sheet or plate comprising a polymer such as a polyimide, a polyamide, a glass, a metal, a graphite or a ceramic capable of withstanding 400° C. Mold 12 may have an upper surface 14 and a thickness in the range from 0.005 mm to 50.0 mm. Mold 12 may have a plurality of cavities 16 which may be arranged in a two dimensional array 18 such as a rectangular or square array with rows and columns spaced apart. Plurality of cavities 16 may have a first shape 20 shown in FIG. 2 such as a hemisphere or a flattened hemisphere including cavity bottom walls 26 and side walls 28. Plurality of cavities 16 function to hold a precise volume of metal consistent with the uniformity of precise cavity volumes.

Figure 2:
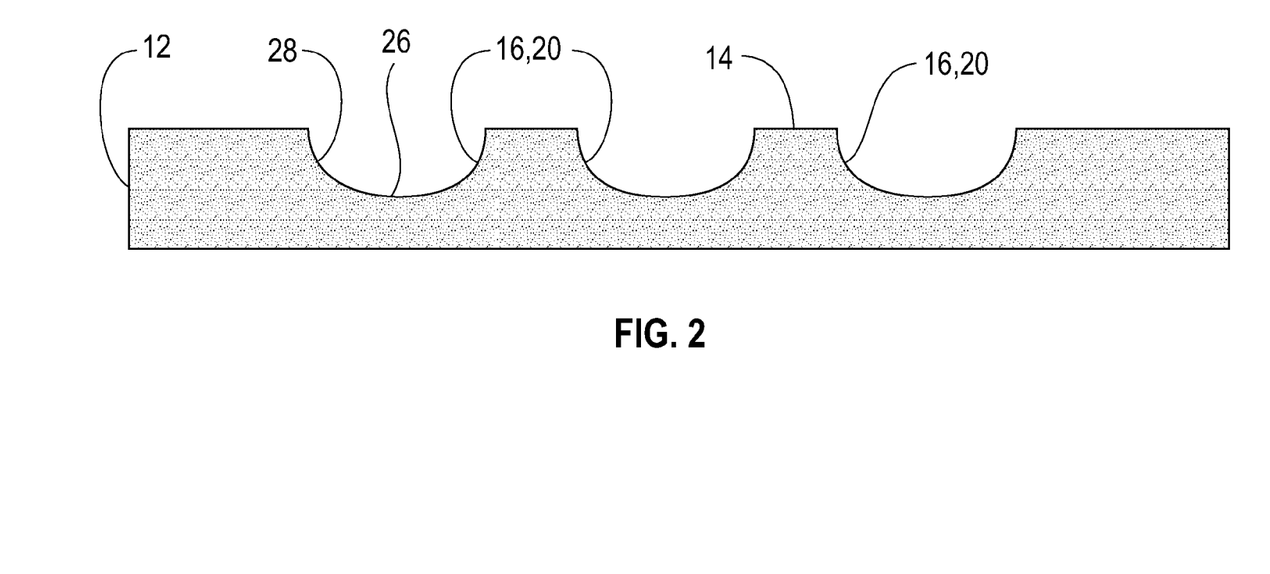
FIG. 2 is a cross-section view along the lines 2-2 of FIG. 1.

FIG. 2 is a cross-section view along the lines 2-2 of FIG. 1. In FIG. 2, plurality of cavities 16 have a bottom wall 26 and are blind cavities i.e. not a through-hole cavity since there is no opening at the bottom. Plurality of cavities 16 are spaced apart on a center-to-center spacing with enough mold material there between to physically support or maintain first cavity shape 20 and the precise volume of cavities 16 when mold 12 is filled. Plurality of cavities 16 may have an aspect ratio, depth to width ratio, in the range from 1/10 to 7/10. The depth of cavity 16 may be in the range from 1/3 to 1 and more preferably 1/2 the depth of the final spherical solder ball.

Figure 3:
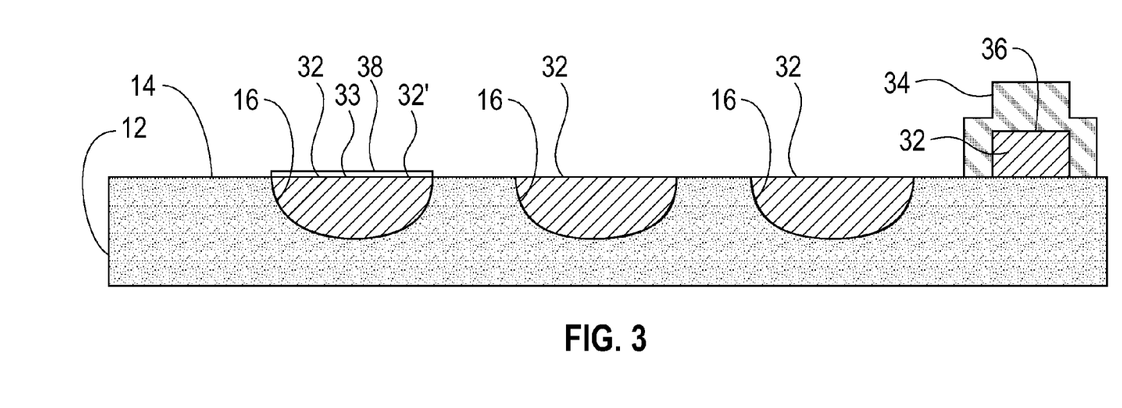
FIG. 3 is a cross-section view along the lines 2-2 of FIG. 1 after blind cavities in the mold are filled with molten solder.

FIG. 3 is a cross-section view along the lines 2-2 of FIG. 1 after cavities 16 in mold 12 have been filled with molten solder 32. Tool 34 which has a reservoir 36 of solder sweeps solder along upper surface 14 into cavities 16 and leaves an upper surface 33 of molten solder 32 in plurality of cavities 16 coplanar with upper surface 14 of mold 12. If molten solder 32 is in an oxygen environment, metal oxides 38 as shown on the left cavity 16 only in FIG. 3 will form on upper surface 33. Metal oxides 38 may be a uniform layer with a smooth surface and may be thicker than 0.001 μm. For a non oxygen environment no metal oxides 38 will form on upper surface 33 as shown in the two cavities 16 in the middle and right side of FIG. 3. Molten solder 32 is cooled below the melting temperature of molten solder 32 to form solid solder 32' shown in the left side cavity 16 in FIGS. 3 and 4. Solder 32 may be selected from the group consisting of Sn, In, Sn—In, Sn—Pb, Sn—Au, Sn—Ag, Sn—Cu, Sn—Bi, Ag—Bi, Sn—Ag—Cu, Sn—Bi—Ag, Sn—Ag—Cu—Zn, Sn—Ag—Cu—Bi, Sn—Ag—Cu—Pd, Sn—Ag—Cu—Ti, Sn—Ag—Cu—Al, Sn—Ag—Cu—Sb, Sn—Ag—Cu—Ce, Sn—Ag—Cu—Ge, Sn—Ag—Cu—Mn, Sn—Ag—Cu—La and combinations thereof.

Figure 4:
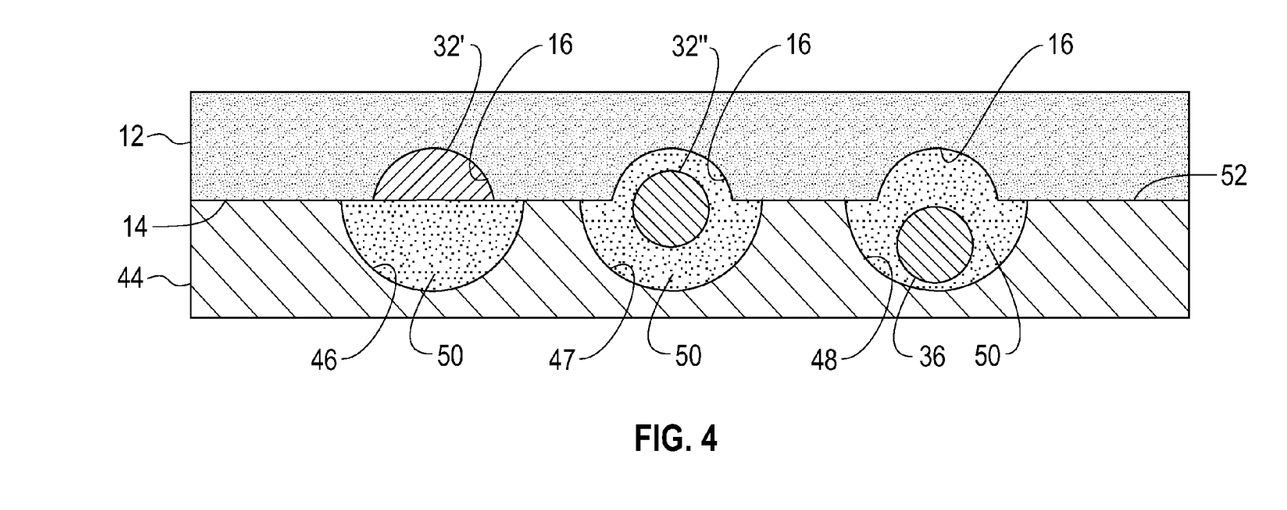
FIG. 4 is a cross-section view after blind cavities in the mold are filled with molten solder as shown in FIG. 3 then positioned upside down face to face with a second plate with matching large fluxed cavities with a left to right time sequence to form spherical solder balls.

FIG. 4 is a cross-section view after blind cavities 16 in mold 12 are filled with molten solder 32 which is cooled to form solid solder 32' shown in the left side cavity 16 in FIGS. 3 and 4. Molten solder 32 is cooled in cavities 16 to form solid metal 32'. In FIG. 4, mold 12 is turned upside down with upper surface 14 facing upper surface 52 of plate 44. Plate 44 has cavities 46-48 having openings facing openings of cavities 16 in mold 12. Cavities 46-48 are filled with liquid 50 which may include a flux. A flux is a reducing agent designed to help reduce or return oxidized metals to their metallic state with the oxygen converted to $H_2O$. Cavities 46-48 may be 2 to 3 times as wide and deep as the width and depth of cavities 16, allowing complete unconstrained reflow of solder volumes from cavities 16 suspended in liquid 50 in cavities 46-48. Cavities 16 in mold 12 and cavities 46-48 in plate 44 may be formed with an ultra violet laser (UV) and/or an eximer laser, or photolithography and wet (or dry) etching. Cavities 16 in mold 12 are blind holes, with precise volumes of solder 32.

Mold 12 may comprise materials which are hydrophobic and where metal such as solder does not wet. While solder does not wet glass or polyimide, solder does form a bond with glass or polyimide that is surprisingly difficult to break. Further, the formation of or retention of metal or metal oxides should be minimized, since metal oxides make spherical balling of metal such as solder due to surface tension much more difficult. Metal oxides such as solder oxides may be minimized by immersing in a liquid containing flux or by controlling the atmosphere during filling cavities 16 with molten metal and while the metal remains molten. A controlled atmosphere would include an inert gas such as nitrogen with oxygen in the range from 10 to 1000 ppm or a reducing gas such as nitrogen gas ($N_2$) or forming gas ($N_2+H_2$). A housing may enclose mold 12 and tool 34 during filling of cavities 16 with molten solder 32 to prevent or reduce metal oxide 38 formation on solder 32.

FIG. 4 shows cavities 46-48 where each cavity is shown during different time periods i.e. a first time period before metal reflow in cavity 46, a second time period during metal reflow in cavity 47 and a third time period after metal reflow in cavity 48. For a given time period the respective cavity 46, 47 or 48 and cavity 16 above would be the same for each of the plurality of cavities 46-48 and each of the plurality of cavities 16. Cavity 16 above cavity 46 shows solder 32' in cavity 16 during a first time period prior to solder reflow. Solder 32' may have metal oxides 38 (not shown) on its upper surface 33 and between solder 32 and cavity 16 walls. Cavity 16 above cavity 47 shows solder 32" entering cavity 47 from cavity 16 during a second time period during reflow when solder 32" is melted to a liquid state. Mold 12 and plate 44 may be heated above the metal melting temperature of metal 32" to reflow metal or solder 32" whereby molten metal 32" is released from cavities 16 in mold 12 and enters, passes or falls due to gravity into liquid 50 which may include a flux for removing metal oxides 38. Cavity 16 above cavity 48 shows solder 36 totally immersed in liquid 50 in cavity 48 during a third time period after reflow of solder 32". Metal 32" is unconstrained in liquid 50 and without oxide material 38 shown in FIG. 3 thereon, metal 32" forms spherical metal balls due to metal surface tension. Spherical metal balls are cooled in cavity 48 such as by cooling plate 44 and liquid 50 below the melting temperature to form solid spherical metal balls 36.

Spherical metal balls have the same dimensions due to cavities 16 holding the same volume or amount of metal 32. Cavities 16 function to measure a uniform amount of metal 32 which in turn provides the same amount of metal in liquid 50. Liquid 50 in cavities 46-48 has no constraints such as metal oxides or cavity walls to influence the metal surface tension of metal 32 and thus spherical metal balls 36 are formed having small or minimal dimensional tolerances. For example, spherical metal balls 36 may have a diameter in the range from 5 μm to 500 μm and preferably in the range from 25 μm to 200 μm. The tolerance or deviation in radius of plurality of metal balls 36 having a diameter in the range from 5 μm to 500 μm may be in the range from 0.5 μm to 10 μm or in the range from 10% to 2% and preferably in the range from 0.5 μm to 5 μm or in the range from 10% to 1%. The tolerance or deviation in radius of plurality of metal balls 36 having a diameter in the range from 25 μm to 200 μm may be in the range from 1 μm to 5 μm or in the range from 4% to 2.5%. Mold 12 with cavities filled with metal and plate 44 with cavities 46-48 filled with liquid 50 such as a liquid flux provides a means to measure metal volume and form spherical metal balls 36 due to metal surface tension. It is noted that metal 32 in liquid 50 is substantially free of metal oxides. Metal oxides reduces and/or compromises the uniformity of the metal surface tension which should be the same in all directions (isotropic). As shown in FIG. 4, middle and right side cavities 16 has liquid 50 filled therein due to metal 32 descending into cavities 47 and 48.

Figure 5:
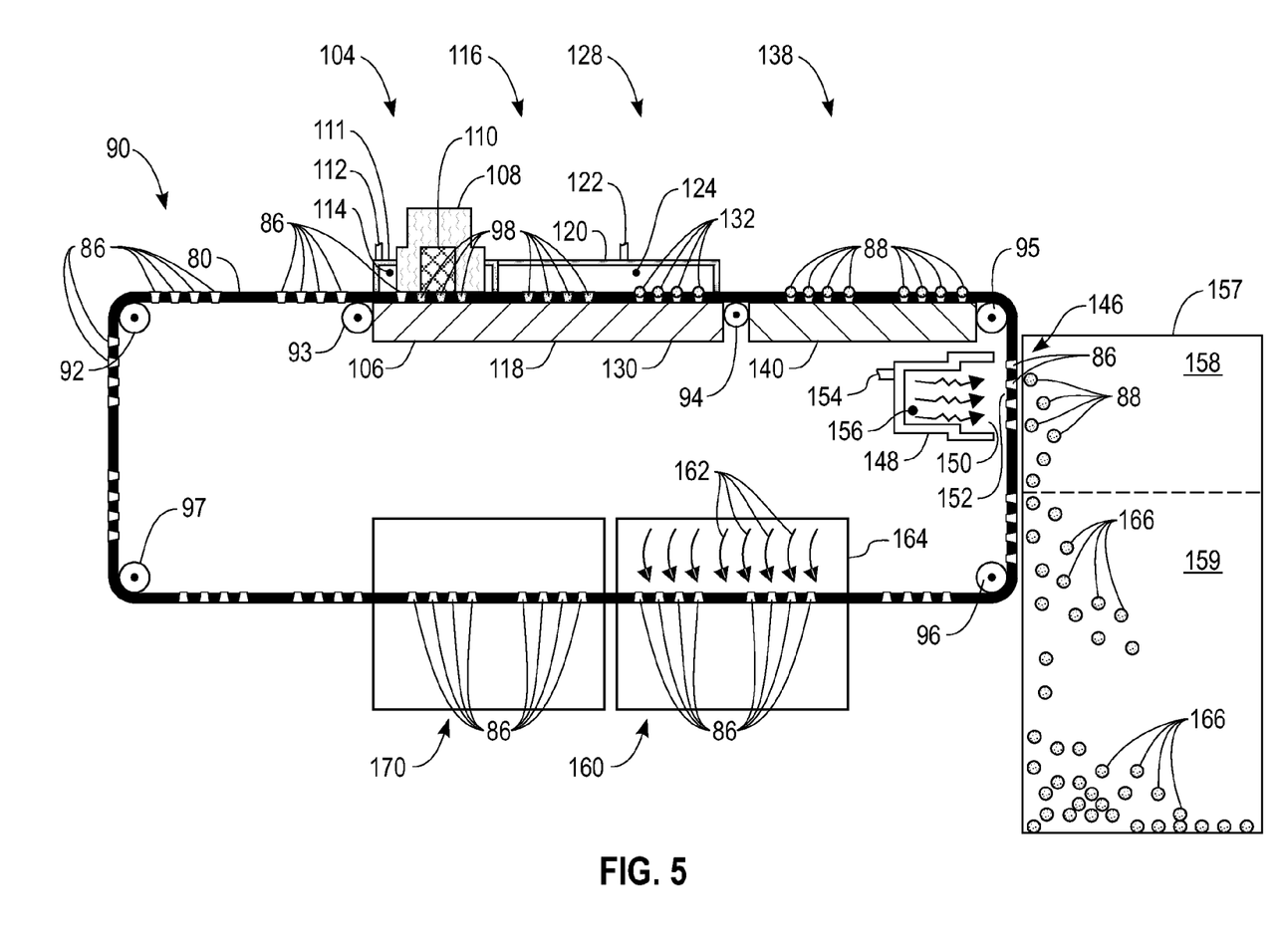
FIG. 5 is a schematic view of a conveyor belt or tape loop with cavities therein and processing stations positioned along the conveyor belt to fill the cavities with molten solder to form solder performs and an unconstrained reflow in a gaseous suspension.

FIG. 5 is a schematic view of a conveyor belt or tape 80 which includes a plurality of through-hole cavities 86 and a plurality of processing stations 104, 116, 128, 138, 146, 160 and 170 positioned along conveyor belt 80 to form spherical solder balls 166. Conveyor belt or tape 80 forms a continuous loop 90 which may be rotated or moved by mechanical means such as by a motor (not shown). Conveyor belt or tape 80 can bend elastically to a predetermined radius of curvature, for example, in the range from infinity to the radius of rollers used to guide tape 80. Conveyor belt or tape 80 may include polyimide and may withstand temperatures of 400° C. Conveyor belt or tape 80 may be positioned over guides 92-97 which may include cylinders or rollers to direct conveyor belt 80 and through-hole cavities 86 passed the plurality of processing stations in sequential order.

A first processing station 104 includes a hot stage 106 for heating conveyor belt or tape 80, an injection molded solder tool 108 which may be the same as tool 34 shown in FIG. 3 for filling the plurality of through-hole cavities 86 with molten solder 98 from reservoir 110 and a housing 111 for containing a gaseous environment and a gas input port 112 for filling housing 111 with gas 114. Gas 114 may be nitrogen ($N_2$) with oxygen in the range from 10 to 1000 ppm to reduce or prevent metal oxides from forming on molten solder 98.

A second processing station 116 includes a hot stage 118 for heating solder 98 above its melting temperature, a housing 120 for containing a gaseous environment and a gas input port 122 for filling housing 120 with gas 124. Gas 124 may be forming gas, a liquid or gas flux, or 100 percent $H_2$ and functions to reduce metal oxides on solder to metal and water.

A third processing station 128 includes a hot stage 130 for heating conveyor belt or tape 80 and solder 98 above the melting temperature of solder 98, a housing such as housing 120 for containing a gaseous environment and a gas input port such as input port 122 for filling housing 120 with gas such as gas 124 to reduce metal oxides on solder to metal and water. Third station 128 functions to reflow solder 98 to form molten spherical solder balls 132 within through-hole cavities 86 which are spherical in shape due to the surface tension of the molten solder which is generally free of metal oxides due to gas 114 and gas 124.

A fourth processing station 138 includes a cold stage 140 for cooling spherical solder balls 132 to solidify spherical solder balls 132 to form spherical solder balls 88. Optionally, a gaseous environment with nitrogen ($N_2$) is used during cooling to avoid formation of oxide at the surface of solder balls 88. If a liquid flux is used in third processing station 128, a cleaning process may be required to remove the flux.

A fifth processing station 146 includes a manifold 148 and opening 150 for directing pressurized gas at the lower side 152 of through-hole cavities 86 and an input port 154 for filling manifold 148 with gas 156 which may be air or nitrogen ($N_2$) whereby the blowing or pressurized gas 156 loosens and removes spherical solder balls 88 from through-hole cavities 86. As shown in FIG. 5, conveyor belt 80 is vertical with respect to earth and solder balls 88 once loosened and removed enter tower 157. Solder balls 88 are melted and reflowed by a heating means in tower 157 such as by the temperature of the gas in heating zone 158 in tower 157 or by radiant energy and are free to fall under the force of gravity through a cooling zone 159 where spherical solder balls 166 are formed by surface tension in an unconstrained environment. In an unconstrained environment, a gaseous reducing environment assures metal oxides are eliminated thus promoting the formation of metal balls with excellent spherical properties. Tower 157 in heating zone 158 and cooling zone 159 may have an atmosphere of one of gas 114, gas 124 and air, respectively.

A sixth processing station 160 is shown for cleaning through-hole cavities 86 with one or more cleaning liquids sprayed as shown by arrows 162 in housing 164 on through-hole cavities 86 as through-hole cavities 86 pass by sixth processing station 160.

A seventh processing station 170 includes a dryer for drying through-hole cavities 86 is shown as through-hole cavities 86 passes by seventh processing station 170. After seventh processing station 170, cavities 86 in conveyor or tape 80 are ready for reuse such as by entering processing station 104.

Figure 6:
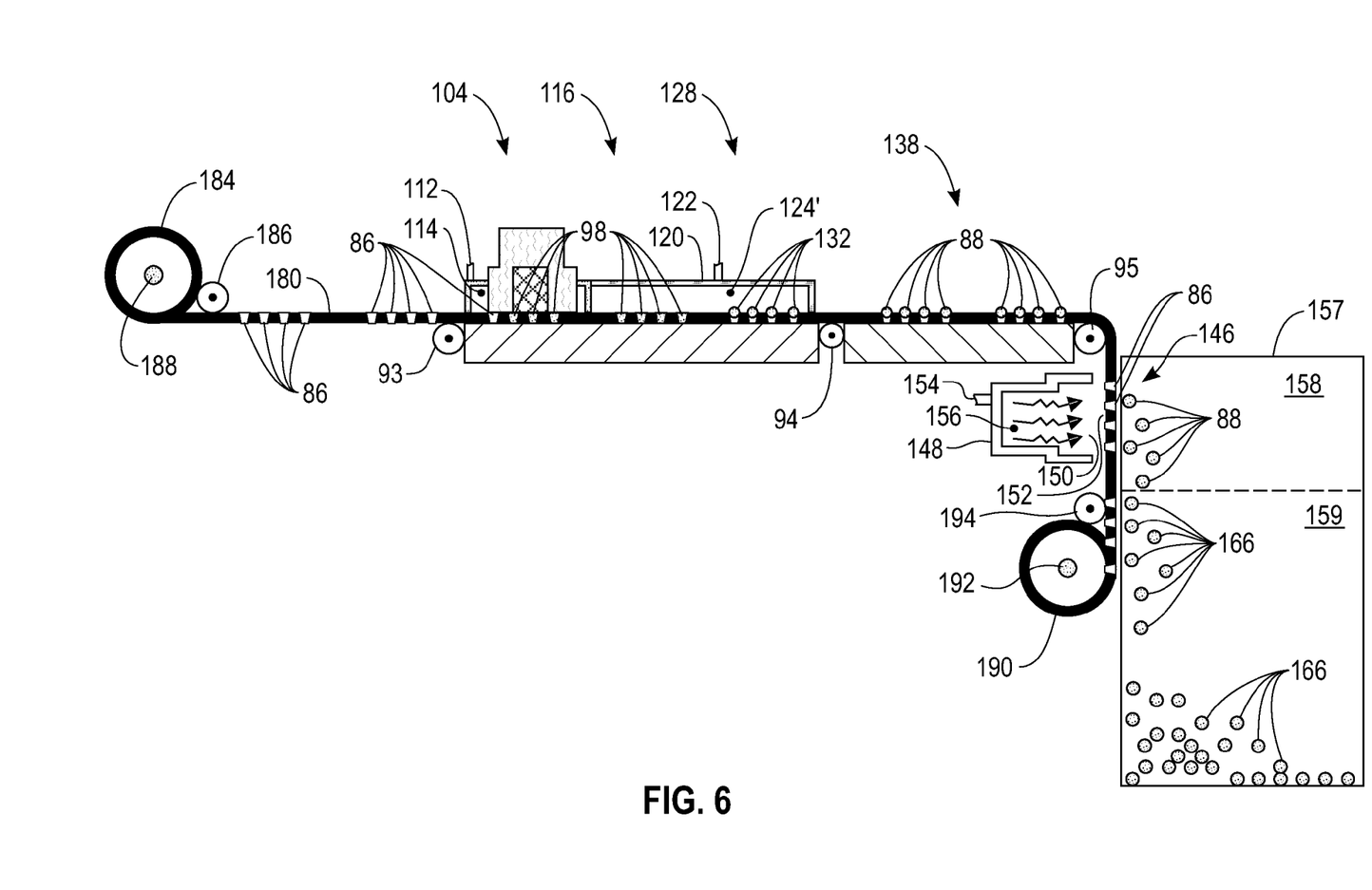
FIG. 6 is a schematic view of a conveyor belt or tape with cavities therein and fluxless processing stations positioned along the conveyor belt to fill the cavities with molten solder to form solder performs and an unconstrained reflow in a gaseous suspension.

FIG. 6 is a schematic view of a conveyor belt or tape 180 which includes a plurality of through-hole cavities 86 and fluxless processing stations 104, 116, 128, 138 and 146 positioned along conveyor belt 180 to form spherical solder balls 166. In second processing station 116 and third processing station 128 gas 124' is one of forming gas ($N_2$ and $H_2$) and 100 percent $H_2$ to provide fluxless processing while preventing or reducing any metal oxides on spherical solder balls 132. Optionally, a gaseous environment with nitrogen ($N_2$) is used during cooling to avoid formation of oxide at the surface of solder balls 88. FIG. 6 shows a conveyor belt roll 184 of conveyor belt or tape 180 to supply a continuous feed of conveyor belt or tape 180 passed guide 186 to first processing station 104. Roll 184 may rotate on a roller 188 to unroll conveyor belt 180.

Conveyor belt or tape 180 may be taken up and rolled into a conveyor belt or take up roll 190 on roller 192 after passing through fifth processing station 146 and guide 194. Rollers 188 and 192 may include a mechanical means such as a motor (not shown) for rotating conveyor belt rolls 188 and 190. In FIG. 6, like references are used for functions corresponding to the apparatus of FIG. 5. In FIG. 6, take up roll 190 may be sent through a cleaning and drying process, for example, processing station 160 and processing station 170 of FIG. 5 thereafter becoming a new supply roll 184 to begin the roll 184 to roll 190 process again.

Figure 7:
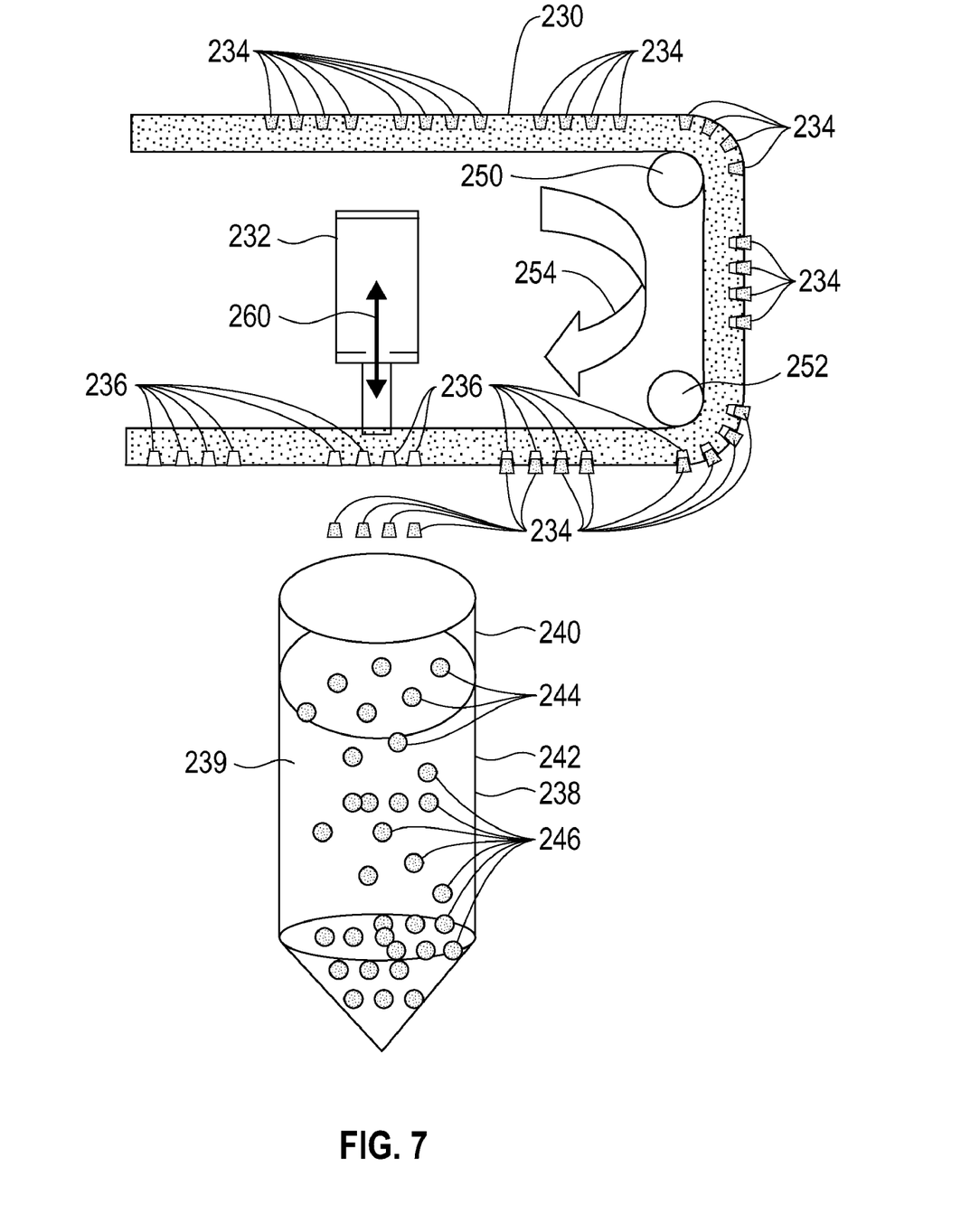
FIG. 7 is a schematic view of a conveyor belt or tape, a vibration transducer for extraction of non-reflowed solder preforms from blind cavities on the conveyor belt or tape, and an oil container having a plurality of temperature zones to form spherical solder balls.

FIG. 7 is a schematic view of a conveyor belt or tape 230, a vibration transducer 232 for extraction of non-reflowed solder 234 from blind cavities 236 in a flexible mold or in conveyor belt or tape 230 and an oil container 238 having oil 239 therein and a plurality of temperature zones 240 and 242 to form molten spherical solder balls 244 from extracted non-reflowed solder 234 from flexible mold or conveyor belt or tape 230. Conveyor belt 230 passes over rollers 250 and 252 and moves in a clockwise direction show by arrow 254. Vibration transducer 232 moves up and down against conveyor belt or tape 230 as shown by arrow 260 to loosen and remove non-reflowed solder 234 from blind cavities 236. Non-reflowed solder 234, once loosened, fall or move away from conveyor belt or tape 230 due to vibration from vibration transducer 232 motion and by gravity into zone 240 of oil container 238. Zone 240 is heated by a heating means such as a heating coil (not shown) above the melting temperature of non-reflowed solder 234 to permit the surface tension of the melted solder balls 244 to form spherical solder balls 244 which descend by gravity into zone 242. Zone 242 has a temperature below the melting temperature of solder balls 244 to solidify solder balls 244 to form spherical solid solder balls 246. Empty blind cavities 236 on conveyor belt or tape 230 are shown under vibration transducer 232 and passed transducer 232.

Figure 8:
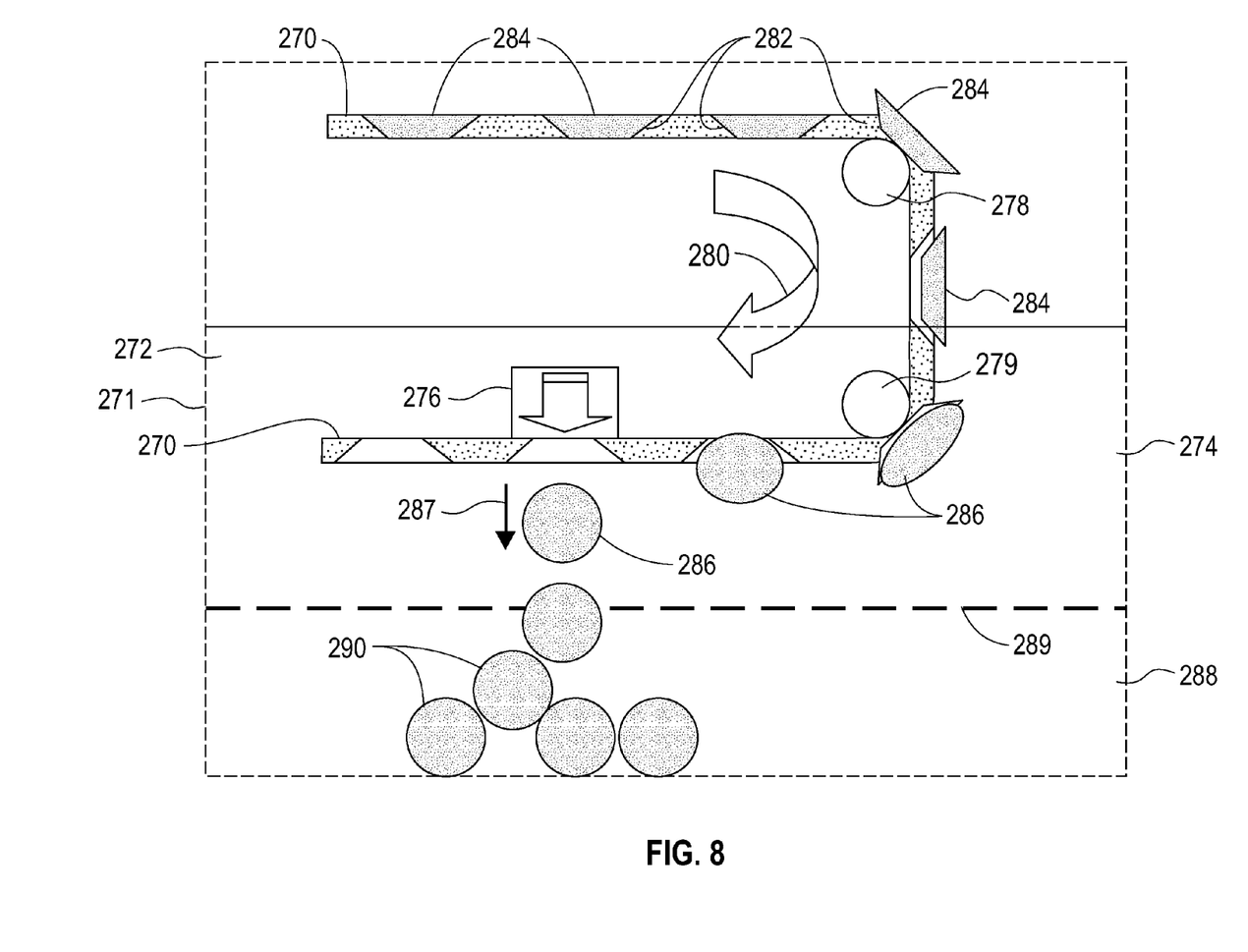
FIG. 8 is a schematic view of a conveyor belt or tape with portions immersed in oil, a hot oil pump immersed in oil, for extraction of non-reflowed solder performs from through hole cavities on the conveyor belt or tape and an oil container containing said oil having a plurality of temperature zones to form spherical solder balls.

FIG. 8 is a schematic view of a conveyor belt or tape 270, with portions immersed in a container 271 for holding liquid 272 such as oil, a hot liquid oil pump 276 immersed in liquid 272, a heater (not shown) for heating hot oil zone 274 and a heater/cooler (not shown) for controlling the temperature of cool oil zone 288. Conveyor belt or tape 270 passes over rollers 278 and 279 and may move in a clockwise direction as shown by arrow 280. Conveyor belt or tape 270 has through-holes 282 therein previously filled with molten metal such as by tool 34 shown in FIG. 3 to form solder preforms 284. Conveyor belt or tape 270 passes into liquid 272, for example, after passing roller 278 and before passing over roller 279. Roller 279 is immersed in liquid 272. Conveyor belt or tape 270 moves solder preforms through liquid 272 through hot oil zone 274 which is heated above the melting temperature of solder preforms 284 which begins a partial reflow of solder preforms 284. Hot oil pump 276 functions to generate an output stream directed on or against one side of conveyor belt or tape 270 and against one side of through-holes 282 pushing reflowed solder balls 286 dislodged or reflowed from solder preform 284 away from conveyor belt or tape 270 into a hot oil zone 274. Reflowed solder 286 is unconstrained in liquid 272 except for liquid 272 and forms a spherical solder ball due to solder surface tension. Reflowed solder 286 descends by gravity into cool oil zone 288 as shown by arrow 287. Cool oil zone 288 below reference line 289 has a temperature below the melting temperature of solder balls 286 to form spherical solid solder balls 290.

While there has been described and illustrated an apparatus and methods for forming spherical solder balls using molds with either blind or through-hole cavities, injection molded solder, a low oxygen environment during metal or solder fill, and a flux or a gas environment to reduce or remove metal oxides prior to or during unconstrained metal or solder reflow in a liquid or gas, it will be apparent to those skilled in the art that modifications and variations are possible without deviating from the broad scope of the invention which shall be limited solely by the scope of the claims appended hereto.

What is claimed is:
1. A method for forming spherical metal balls comprising:
   filling cavities in a mold with molten metal;
   cooling said molten metal to a solid in said cavities in said mold;
   selecting a plate having cavities having openings facing openings of said cavities in said mold;
   said cavities in said plate larger than said corresponding facing cavities in said mold;
   filling said cavities in said plate with a liquid for removing metal oxides;
   placing said cavity openings of said mold facing downwards and above said corresponding cavity openings facing upwards in said plate;
   heating said mold and plate above a metal melting temperature to reflow said metal whereby said metal is released from said cavity in said mold and passes into said liquid in said corresponding facing cavity in said plate, said metal being unconstrained in said liquid forming spherical metal balls due to metal surface tension; and
   cooling said spherical metal balls below said melting temperature to form solid spherical metal balls.

2. The method of claim 1 wherein said cavities in said mold have a shape of one of a hemisphere and flattened hemisphere to form blind cavities and function to hold a precise volume of metal.

3. The method of claim 1 wherein said cavities in said mold have an aspect ratio, depth to width ratio, in the range from 1/10 to 7/10.

4. The method of claim 1 wherein said mold comprises at least one of a polymer, glass, metal, a crystalline Si containing substrate, graphite and ceramic.

5. The method of claim 1 wherein said plate comprises at least one of a polymer, glass, metal, crystalline Si containing substrate, graphite and ceramic.

6. The method of claim 1 wherein filling said plurality of cavities in said mold includes providing a gaseous environment of an inert gas and wherein said gaseous environment has an oxygen level less than 1000 ppm.

7. The method of claim 1 wherein cavities in said plate are 2 to 3 times as wide and deep as the width and depth of cavities in said mold allowing complete unconstrained reflow of metal volumes passing from said cavities in said mold.

8. The method of claim 1 wherein said solid speherical metal balls have a diameter in range from 5 μm to 500 μm.

9. The method of claim 8 wherein a deviation in radius of said spherical metal balls is in the range from 10% to 2%.

10. The method of claim 1 wherein said liquid for removing metal oxides includes a liquid flux to provide spherical metal balls substantially free of metal oxides.

* * * * *